United States Patent
Lee et al.

(10) Patent No.: US 6,881,248 B2
(45) Date of Patent: Apr. 19, 2005

(54) PAINT COMPOSITION

(75) Inventors: Han Lim Lee, Kuala Lumpur (MY); Nazni Wasi Ahmad, Kuala Lumpur (MY); Abdullah Abdul Ghani, Kuala Lumpur (MY)

(73) Assignee: Institute for Medical Research, Kuala Lumpur (MY)

( * ) Notice: Subject to any disclaimer, the term of this patent is extended or adjusted under 35 U.S.C. 154(b) by 0 days.

(21) Appl. No.: 10/732,021

(22) Filed: Dec. 10, 2003

(65) Prior Publication Data

US 2004/0134377 A1 Jul. 15, 2004

(30) Foreign Application Priority Data

Dec. 30, 2002 (MY) ....................................... PI 20024747

(51) Int. Cl.$^7$ ............................ A01N 53/00; C09D 5/14
(52) U.S. Cl. ................ 106/18.32; 106/15.05; 106/18.35; 424/405; 514/519; 514/520; 514/521
(58) Field of Search .......................... 106/15.05, 18.32, 106/18.35, 18.34; 424/405; 514/519, 520, 521

(56) References Cited

U.S. PATENT DOCUMENTS

| | | | | |
|---|---|---|---|---|
| 3,859,121 A | * | 1/1975 | Yeadon et al. | 427/292 |
| 4,056,610 A | * | 11/1977 | Barber et al. | 424/419 |
| 5,194,264 A | * | 3/1993 | Van Tonder | 424/405 |
| 5,466,458 A | * | 11/1995 | Martin et al. | 424/405 |
| 6,576,661 B1 | * | 6/2003 | Bruck et al. | 514/462 |
| 2004/0037782 A1 | * | 2/2004 | Hernandez et al. | 424/45 |

FOREIGN PATENT DOCUMENTS

| | | | | |
|---|---|---|---|---|
| GB | 2095109 A | * | 9/1982 | |
| JP | 63-315670 A | * | 12/1988 | |
| JP | 7-118112 A | * | 5/1995 | |

OTHER PUBLICATIONS

Derwent Abstract No. 1991–310827, abstract of BR Patent Application No. 9102543A (Sep. 1991).*

Derwent Abstract No. 1991–310828, abstract of BR Patent Application No. 9102544A (Sep. 1991).*

Derwent Abstract No. 2004–317157, abstract of CN Patent Application No. 1458198 (Nov. 2003).*

Derwent Abstract No. 2004–317157, abstract of Chinese Patent Specification No. 1458198A (Nov. 26, 2003).*

* cited by examiner

Primary Examiner—Anthony J. Green
(74) Attorney, Agent, or Firm—Omri M. Behr

(57) ABSTRACT

A paint composition containing an insecticide and piperonyl butoxide as a synergist.

1 Claim, No Drawings

PAINT COMPOSITION

FIELD OF THE INVENTION

The present invention relates to an insecticidal paint composition containing a synergist and a process for the preparation thereof.

BACKGROUND OF THE INVENTION

Vector control is a perennial problem in countries situated in tropical and sub-temperate climate zones where insects such as mosquitoes, houseflies, cockroaches, etc. could spread life-threatening diseases, some of which are contagious. The health authorities in developing and under-developed countries are faced with difficult tasks of administering effective vector control programmes within tight budgetary constraints especially in situations where they have to reach out to rudimentary settlements in remote areas, which because of the geographical spread, are costly to administer. The cost effectiveness of these programmes is of paramount importance in controlling outbreak of diseases. Lower spending on preventive measures may lead to higher cost in containing the outbreak of a disease, besides causing politically unacceptable public fear and protests and even social unrest. For instance, in sparsely populated rural areas, the use of fogging method in controlling the population of mosquitoes as a means of controlling the spread of diseases such as dengue fever and malaria are costly and ineffective.

In delivering a chemical insecticide, another consideration is the health hazard on the populace. Yet another consideration is the method to be deployed, taking into consideration the ambient especially home dwellings, food production factories and so on.

It was observed that insects rest and crawl on walls and surfaces of a building. Coating the interior and external walls and surfaces of a construction such as dwellings, hospitals, restaurants, etc. with insecticide is therefore a cost effective way in exterminating insect pests, especially in remote rural areas. However, in buildings where aesthetic appearance is also considerations, the mere applications of insecticide on surfaces of buildings are not a palatable solution. To overcome this shortcoming, emulsion paint impregnated with insecticide was developed. In this way, paint composition served the dual purposes of improving the adiabatic characteristic and beauty of construction as well as serving as a very simple but effective mean of delivering a chemical insecticide for the control and elimination of insect pests especially those in houses, food processing and production factories, hospitals, ships, etc.

Research on acquiring paint compositions which can be applied to every construction and having a sufficient insecticidal effect has been continued for a long time, and various examples are exemplified below.

U.K. Patent application (Publication No. 2142239), published on 16 Jan. 1985 discloses a paint formulation containing insecticides such as pyrethrins and cholorpyrifos. The insecticides are brought to the surface and locked by polymers in said paint system and held in even distribution. Insects of common household pests absorb dosages of the insecticide by entering into contact with the painted surfaces and subsequently die.

European Patent application (Publication No. 0859035), published on 19 Aug. 1998 discloses a spray type insecticidal paint which has long lasting insecticidal effects by contact against various insects but is not harmful to human and warm-blooded animals. The main insecticidal ingredient used is selected from the pyrethroid insecticides such as deltamethrin, permethrin and cypermethrin.

In addition to paint having an insecticide as an active ingredient, paint containing insect repellent has also been formulated. For example, U.S. Pat. No. 5,843,215, published on 1 Dec. 1998 discloses insect repellent paint containing natural plant secondary compounds which are not harmful to the environment or human beings, as an insect repellent component. The plant secondary compounds include Cuminaldehyde, Pinene, Limonene, Eucalytol, Perilladehyde, Linalool, Tumeric oil, Cinnamon oil, and a mixture thereof. These compounds function is to repel insects. A paint varnish disclosed in this patent can be advantageously utilized as a package of foodstuffs.

One of the main problems encountered in paint composition containing insecticides is that the numerous effective insecticidal active ingredients are decomposed by the mitochondrial non-specific oxidative enzymes of the insects so rapidly that the exerted effect is very low. Accordingly the insecticide efficacy is not maintained when the insects developed resistance to the insecticides.

Research on overcoming the development of resistance to insecticides in insects has been continued for a long time and various literature have described the use of piperonyl butoxide as an agent to inhibit the rapid inactivation of the active ingredient in insecticidal combinations.

For example, U.S. Pat. No. 4,524,068, published on 18 Jun. 1985 discloses inclusion complexes of piperonyl butoxide and cyclodextrin, compositions containing them, processes for their preparation and the use of the complexes in insecticidal or fungicidal combinations to synergize the activity of pyrethrines, synthetic pyrethroides or organophosphates.

U.S. Pat. No. 5,883,112, published on 16 Mar. 1999 discloses a synergistic composition comprising pesticidal 5-amino-4ethylsulfinyl-1-arylpyrazoles and piperonyl butoxide, compositions containing them, processes for their preparation and their use as insecticides.

The synergistic effect of piperonyl butoxide and other similar synergistic components manifests itself in the fact that the said agent inhibits the rapid inactivation of the active ingredient by the oxidase enzymes of mixed function found in the insects. The said synergistic agents are useful not only in combination with insecticides but also with fungicides and they are capable of increasing the effect of the active ingredient by ten to fifty times.

As described above, various methods have been developed separately to produce paints containing insecticides on the one hand and insecticidal combinations containing piperonyl butoxide as a synergist on the other hand. However, the inclusion of piperonyl butoxide as a synergist in paint compositions containing insecticides has not been described in any of the prior art documents. In recognition of the situation, the present inventors have earnestly investigated and consequently developed paint compositions containing both insecticides and piperonyl butoxide as a synergist. The paint thus developed according to this invention is found to be effective in overcoming the development of resistance to insecticides in insects.

SUMMARY OF THE INVENTION

Accordingly, it is an object of the present invention to provide a paint composition containing an insecticide, a synergist and paint, and which can counter the development of resistance to insecticides in insects.

To accomplish the object, there is provided in the present invention a paint composition comprising an insecticide as the first component, a synergist that inhibits the development of resistance to insecticides in insects as the second component, and paint as the third component.

Another object of the present invention is to provide a process for the preparation of a paint composition containing an insecticide, a synergist and paint, and which can counter the development of resistance to insecticides in insects.

To accomplish the second object, there is provided in the present invention a process for the preparation of a paint composition comprising an insecticide as the first component, piperonyl butoxide which is the synergist as the second component and the balance paint. According to this process, the amount of insecticide and piperonyl butoxide used in the preparation of the paint composition is based on the volume of paint used.

DETAILED DESCRIPTION OF THE INVENTION

A paint composition according to the invention can be aqueous or solvent-based type. In the present invention, the paint used is the aqueous type such as for example, emulsion paint. When aqueous type paint is used, the preferred insecticide used is pyrethroid type insecticide and the preferred synergist is piperonyl butoxide.

As for the pyrethroid type insecticide, deltamethrin, allethrin, phenothrin, permethrin, tetramethrin, cypermethrin and lambda-cyhalothrin can be utilised. In the present invention, the preferred pyrethroid use is deltamethrin. When mixing the paint with insecticide, the preferred amount of insecticide to be added is in the range of 25 mg to 50 mg per litre of paint used.

When mixing the paint with synergist, the preferred amount of piperonyl butoxide to be added to the paint is in the range of 12.5 mg to 1350 mg per litre of paint used.

In use, the paint of this invention is painted on any surfaces and the insecticide and synergist become firmly fixed onto the surfaces when the paint dries. Furthermore, the paints of this invention are completely independent of the types of insecticides used.

Tests carried out on various species of insects have shown that paints according to the invention have satisfactory activity for surprisingly long periods of time and which is not decrease by the action of weathering or occasional abrasive action. This prolongation of insecticidal activity provided by the paints of the invention demonstrates the synergistic effect of piperonyl butoxide in inhibiting the development of resistance to insecticides in insects. From the toxicological point of view, the present invention prevents the insecticide from polluting foodstuffs in dwellings as in the case when a fogging method is used in controlling the population of mosquitoes. The possibility that insecticide particles can be removed from the surfaces by rubbing by men or animals, causing toxicity by ingestion or absorption through the skin is also considerably reduced because the insecticide is not applied directly on to the walls of dwellings when paints made according to the invention is used.

The examples below illustrate the paints obtainable according to the invention.

EXAMPLE 1

5 litres of an aqueous emulsion paint is mixed with 150 mg of deltamethrin. The mixture is thoroughly mixed by stirring for 5 minutes. 3000 mg of piperonyl butoxide is then added to the mixture and again thoroughly stirred for another 5 minutes until a homogenous composition is obtained. The paint composition thus obtained is stored in sealed plastic or metallic container to prevent evaporation and to maintain the effectiveness of the insecticide.

EXAMPLE 2

The process as described in example 1 is used except that the aqueous emulsion paint is replaced with solvent-based type paint. In this example, oil based type paint is used. While the invention has been described in term of examples, the skilled artisan will appreciate that various modifications, substitutions, omissions, and changes may be made without departing from the spirit thereof. Accordingly, it is intended that the scope of the present invention be defined by the scope of the following claims, including equivalents thereof.

What is claimed is:

1. A paint composition which can counter the development of resistance to insecticides in insects comprising deltamethrin in the range of 25 mg to 50 mg per liter of paint used as the first component, piperonyl butoxide in the range of 12.5 to 1350 mg per liter of paint used and emulsion paint as the third component.

* * * * *